United States Patent
Beresic

[15] 3,697,708
[45] Oct. 10, 1972

[54] HOPPER MATERIAL SUPPLY INDICATOR

[72] Inventor: John I. Beresic, 2900 West Lincoln, Phoenix, Ariz. 85005

[22] Filed: June 11, 1971

[21] Appl. No.: 152,278

[52] U.S. Cl..............................200/61.21, 340/246
[51] Int. Cl...............................................H01n 9/16
[58] Field of Search............73/301; 200/61.21, 61.2; 340/246

[56] References Cited

UNITED STATES PATENTS 1,281,013  10/1918  Humphreys.........200/61.21 X

Primary Examiner—Robert K. Schaeffer
Assistant Examiner—M. Ginsburg
Attorney—Warren F. B. Lindsley

[57] ABSTRACT

A supply indicator for measuring the level of granular material stored in a bin, tank, silo or the like wherein a series of vertically spaced sensing limit switches are placed in and arranged to extend outwardly of a longitudinal slot in a tubular metallic housing. The housing is arranged within and longitudinally of the bin, tank, silo or the like and employs a flexible cylindrical sleeve tightly fitted over the housing which is capable of actuating indicating devices in a continuous fashion to note the changes in the level of the material in the hopper.

8 Claims, 8 Drawing Figures

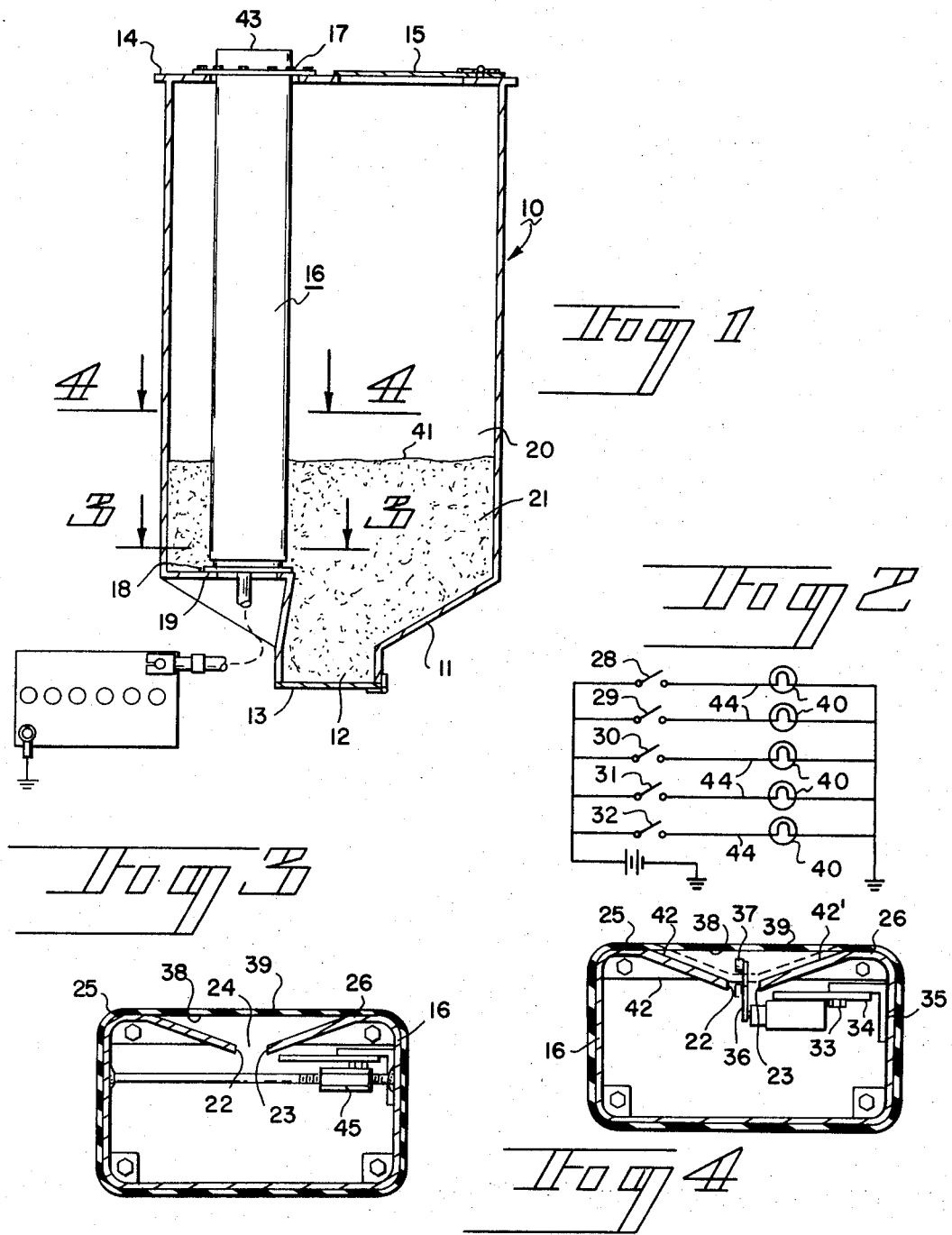

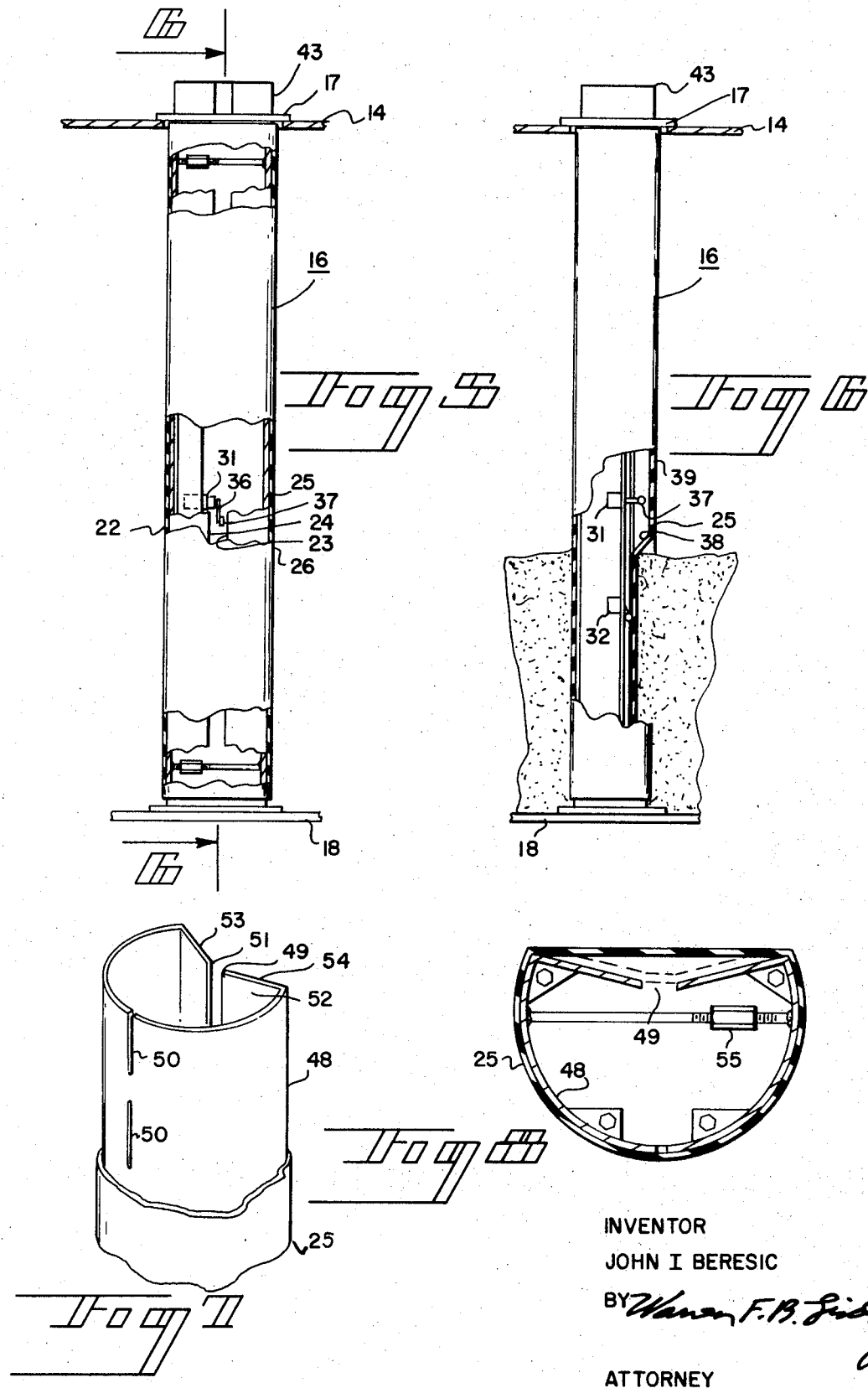

HOPPER MATERIAL SUPPLY INDICATOR

BACKGROUND OF THE INVENTION

This invention relates to an improvement of the hopper material supply indicator shown, described and claimed in U.S. Pat. No. 3,550,447.

Apparatus for indicating the level of heavy coarse granular materials in hoppers or bins have been provided. However, the sensing elements have been easily damaged by such material when dumped into the hopper or the resilient coverings for protecting the sensing elements have been difficult to install and costly to replace.

DESCRIPTION OF THE PRIOR ART

As shown in U.S. Pat. No. 3,550,447, the diaphragm protecting the sensing elements extends along only one part of the longitudinal surface of the housing enclosing the limit switches, but more particularly is attached to the housing by a plurality of bolts requiring an extensive amount of labor to install tightly and to remove for servicing the limit switches or for replacement of the resilient material.

SUMMARY OF THE INVENTION

In accordance with the invention claimed an improved material level indicator is provided for heavy coarse granular material which is rugged and durable and capable of easily being serviced or parts thereof replaced.

An object of this invention is to provide a material level indicator for a hopper of coarse heavy granular substances which presents a relatively smooth exterior surface so as to avoid hampering the free gravity flow of materials down through the hopper to the point of discharge.

A further object of this invention is to provide a material level indicator employing a cylindrical flexible diaphragm around a tubular limit switch supporting housing which is easily mounted, removed or replaced.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawing in which:

FIG. 1 is a sectional view of a material supply hopper showing the material level indicating apparatus of this invention installed therein;

FIG. 2 is a wiring diagram for the material level indicating apparatus;

FIG. 3 is an enlarged cross-sectional view of the indicator in FIG. 1 taken along the line 3 — 3;

FIG. 4 is an enlarged cross-sectional view of the indicator in FIG. 1 taken along the line 4 — 4;

FIG. 5 is a front elevation of the level indicator partly broken away to show the interior limit switch sensing element in an actuating position;

FIG. 6 is a vertical view partly in section on the line 6 — 6 of FIG. 5;

FIG. 7 is a modification of the tubular switch enclosing housing shown in FIGS. 1–6 wherein the housing is spacedly slotted longitudinally thereof to render it easier to bend inwardly to receive the cylindrical encircling flexible diaphragm; and FIG. 8 is an end view of a cylindrical type switch housing showing the turn buckles at one end and surrounded by a flexible diaphragm.

DESCRIPTION OF THE PREFERRED EMBODIMENTS

Referring more particularly to the drawing by characters of reference, FIG. 1 discloses a hopper 10 having a sloping bottom 11 and the usual material discharge opening 12 and close off door 13. A suitable top cover 14 having an access door 15 through which the materials are dumped is provided for the top of the hopper.

The level indicator mechanism comprises a rectangular vertically disposed housing 16 having an upper mounting flange 17 suitably fastened to the top 14 of the hopper 10 and a lower flange 18 fixed to a suitable horizontal offset 19 of the hopper. The interior chamber 20 of hopper 10 contains the granular materials 21.

The hollow housing 16 as shown in FIGS. 3 and 4 has a slotted out portion on one side, the facing edge 22 and 23 of which forms a narrow slit 24 extending vertically of the housing 16. A flexible cylindrical diaphragm 25 is slipped over the housing 16 and the slotted out portion of front face 26 of the housing 16 as indicated.

A series of sensing elements such as the limit switches 28, 29, 30, 31 and 32 are adjustably secured by bolt 33 in spaced vertical positions on the mounting rail 34 which in turn is demountably secured to support brackets 35 suitably secured to the housing 16. Each limit switch 28–32 has an actuating arm 36 and contact roller 37 which is positioned adjacent the rear surface 38 of the diaphragm so that when material in the hopper chamber 20 presses against the outside surface 39 of the diaphragm the limit switch arm will be actuated to operate the limit switch turning on its associated signal light 40 electrically connected as shown in FIG. 2. Above the material level 41 the diaphragm 25 would not be deflected inwardly against the sloping angularly disposed back up surfaces 42 of the plates forming the facing edges 22 and 23 so that limit switches 28, 29, and 30, for example, would be open and their associated indicator lights 40 would be out, thus showing the level 41 of the material in the hopper. It is important to note that the combination of the diaphragm surrounding the housing 16 with the sloping back up closure plates forming edges 23 and 24 forming a narrow slit 24 for the limit switch arms 36 and rollers 37 provide a durable rugged construction to withstand the dumping of heavy coarse materials through the access door 15 into the hopper 10 and at the same time providing a smooth unobstructed surface over housing 16 to allow free settling of the materials 21 toward the discharge opening 12. It is to be further noted that the array of limit switches 28–32 on the mounting rail may be readily placed in and removed from the mounting rail on the brackets 35 by inserting or removing the rail from the open top 43 of the housing 16, thus enabling the quick application and spacing of the limit switches as required and the easy servicing of the switches and wiring 44 as required without disturbing the materials in the hopper chamber 20.

It should be recognized that by utilizing a live rubber cylindrical flexible member 25 it may be readily mounted on housing 16 even though rectangularly in configuration by merely slipping it on over housing 16 from one end thereof. To aid in squeezing the housing inwardly to be able to slide member 25 over it a pair of turn buckles 45 are provided, one mounted to extend between the inside walls of each end of housing 16. As well known in the art, as the turn buckle is tightened the opposite walls of housing 16 are drawn toward each other. In this condition the flexible member 25 may be readily slid over housing 16. After member 25 surrounds housing 16 in proper association therewith the turn buckles are turned to cause the opposite walls of housing 16 to move away from each other, thereby stretching member 25 causing it to be taut and tight around housing 16 as shown in FIGS. 3 and 4.

FIG. 7 and 8 illustrate a modification of the structure shown in FIGS. 1–6 wherein housing 16 is replaced with a cylindrical housing member 48 slotted at 49 to extend longitudinally thereof. At a point on the cylindrical housing member 48 opposite to slot 49 the housing is provided with a plurality of slots 50 aligned and spacedly arranged longitudinally of the housing member. The facing edges 51 and 52 forming slot 49 are formed to provide an inwardly sloping plane surfaces 53 and 54.

As shown in FIGS. 2 and 3, each end of housing member 48 is provided with a turn buckle 55 which makes it possible together with the aid of slots 50 to bend the walls of housing member 48 inwardly to receive the cylindrical flexible member 25 in the manner disclosed in FIGS. 1–6.

Thus the housing member of FIGS. 1–6 may be of a variety of hollow tubular configurations all arranged to provide a slot extending longitudinally thereof for presenting outwardly thereof a plurality of spacedly arranged limit switches.

Each housing member is arranged to receive in snug tight association therewith an enclosing diaphragm.

Although but a few embodiments of the present invention have been illustrated and described, it will be apparent to those skilled in the art that various changes and modifications may be made therein without departing from the spirit of the invention or from the scope of the appended claims.

I claim:

1. A hopper material supply indicator comprising in combination:

a vertically disposed hollow housing having a longitudinally extending slotted-out portion, said slotted-out portion being formed by a pair of sloping plane surfaces having facing edges forming a narrow slit, a cylindrical flexible diaphragm surrounding said housing in snug tight arrangement therewith, a series of limit switches mounted in longitudinally spaced positions within the housing, and an actuating arm on the limit switches protruding through the narrow slit operatively to be engaged by the rear surface of the diaphragm.

2. The hopper material supply indicator of claim 1 in further combination with a turn buckle mounted within each end of said housing for increasing and decreasing the tension on opposite walls of said housing to aid in placing and removing the diaphragm from around said housing and for causing said diaphragm to snugly fit around said housing when said indicator is in use.

3. The hopper material supply indicator of claim 1 wherein said housing comprises a hollow tubular housing having a rectangular cross section.

4. The hopper material supply indicator of claim 1 wherein said housing has an arcuate cross-sectional configuration.

5. The hopper material supply indicator of claim 1 wherein said diaphragm is formed of flexible rubber.

6. The hopper material supply indicator of claim 4 wherein said housing is slotted along its surface opposite to said slit for aiding in squeezing said housing to readily receive said diaphragm.

7. The hopper material supply indicator of claim 1 wherein the series of limit switches are mounted on a rail detachably secured to the inside of said housing and insertable and removable from one end of the housing.

8. The hopper material supply indicator of claim 1 wherein said slit extends the full length of said housing.

* * * * *